(12) United States Patent
Mahmoud

(10) Patent No.: US 7,502,942 B1
(45) Date of Patent: *Mar. 10, 2009

(54) SYSTEM AND METHOD FOR AUTHENTICATION OF EMBEDDED RAID ON A MOTHERBOARD HAVING INPUT/OUTPUT PROCESSOR

(75) Inventor: Fadi A. Mahmoud, Livermore, CA (US)

(73) Assignee: Adaptec, Inc., Milpitas, CA (US)

( * ) Notice: Subject to any disclaimer, the term of this patent is extended or adjusted under 35 U.S.C. 154(b) by 580 days.

This patent is subject to a terminal disclaimer.

(21) Appl. No.: 10/741,234

(22) Filed: Dec. 19, 2003

(51) Int. Cl.
*H04L 9/32* (2006.01)

(52) U.S. Cl. .......................... 713/189; 713/168; 726/34

(58) Field of Classification Search ................ 713/164, 713/189, 187, 191, 192, 166–170; 726/16, 726/17, 22, 34, 35; 710/28, 36, 200; 711/163–164
See application file for complete search history.

(56) References Cited

U.S. PATENT DOCUMENTS

| | | | | |
|---|---|---|---|---|
| 5,859,911 | A * | 1/1999 | Angelo et al. ................ 713/187 |
| 5,864,664 | A * | 1/1999 | Capps et al. ................... 726/34 |
| 6,032,257 | A * | 2/2000 | Olarig et al. ................... 726/35 |
| 6,065,096 | A * | 5/2000 | Day et al. .................... 711/114 |
| 6,085,332 | A * | 7/2000 | El-Batal ......................... 714/5 |
| 6,463,537 | B1 * | 10/2002 | Tello .......................... 713/182 |
| 6,571,335 | B1 * | 5/2003 | O'Donnell et al. .......... 713/173 |
| 6,745,258 | B1 * | 6/2004 | Pellegrino et al. ............. 710/33 |
| 6,813,718 | B2 * | 11/2004 | Colvin ......................... 726/26 |
| 6,859,886 | B1 * | 2/2005 | Johnson ....................... 713/600 |
| 6,970,986 | B1 * | 11/2005 | Mahmoud .................... 711/158 |
| 7,058,811 | B2 * | 6/2006 | Spain et al. .................. 713/176 |
| 7,100,036 | B2 * | 8/2006 | Schwartz ....................... 713/2 |
| 7,260,848 | B2 * | 8/2007 | Zimmer ....................... 726/27 |
| 7,366,888 | B2 * | 4/2008 | Dayan et al. .................... 713/2 |
| 2002/0133669 | A1 * | 9/2002 | Devireddy et al. .......... 711/114 |
| 2004/0010656 | A1 * | 1/2004 | Chiao et al. ................. 711/103 |
| 2004/0025036 | A1 * | 2/2004 | Balard et al. ................ 713/189 |
| 2004/0064658 | A1 * | 4/2004 | Chang ......................... 711/162 |
| 2004/0193913 | A1 * | 9/2004 | Han et al. .................... 713/200 |
| 2004/0268339 | A1 * | 12/2004 | Van Someren et al. ...... 717/172 |
| 2006/0224878 | A1 * | 10/2006 | Datta et al. ...................... 713/2 |

OTHER PUBLICATIONS

Penokie, George, "Information Technology—SCSI Architecture Model 4—Rev.7," Jul. 24, 2006. Retrieved from http://www.t10.org/ftp/t10/drafts/sam4/sam4r07.pdf.*
"How Device Drivers Work," updated Mar. 2003. Microsoft Technet. "Driver Signing and Digital Signatures" section, pp. 1-2. 9 pages. Retrieved from http://technet2.microsoft.com/WindowServer/en/library/2e81a334-ece5-4210-815a-6a2ea33f61151033.mspx.*

* cited by examiner

*Primary Examiner*—Kim Vu
*Assistant Examiner*—Nirav Patel
(74) *Attorney, Agent, or Firm*—Martine Penilla & Gencarella, LLP

(57) ABSTRACT

An invention is provided for authenticating software associated an embedded device on a motherboard having an IOP is disclosed. The method includes generating a unique authentication code (UAC) based on a serial number for a motherboard. The UAC is provided to a computer system having the motherboard, and a determination is made as to whether the provided UAC is correct for the motherboard. When the provided UAC is correct for the motherboard, the IOP is allowed to execute program instructions for the embedded device.

20 Claims, 8 Drawing Sheets

SYSTEM AND METHOD FOR AUTHENTICATION OF EMBEDDED RAID ON A MOTHERBOARD HAVING INPUT/OUTPUT PROCESSOR

CROSS REFERENCE TO RELATED APPLICATIONS

This application is related to 1) U.S. patent application Ser. No. 10/740,971, filed Dec. 19, 2003, and entitled "System and Method for Authentication of Embedded RAID on a Motherboard," and 2) U.S. patent application Ser. No. 11/054,785, filed Feb. 9, 2005, and entitled "System and Method for Authentication of Embedded RAID on a Host RAID Card," each of which is incorporated herein be reference.

BACKGROUND OF THE INVENTION

1. Field of the Invention

This invention relates generally to I/O processor based controller software, and more particularly to systems and methods for authentication of embedded RAID on a motherboard having an input/output processor.

2. Description of the Related Art

The use of personal computers has expanded remarkably in recent years. Modern personal computers are generally characterized by a flexible hardware architecture and a relatively open software architecture. The use of standardized hardware interfaces has permitted users to customize their personal computers to meet their particular hardware and software needs with greater ease than previously available. In consequence, a variety of input and output devices are available for most popular personal computers.

The open hardware interfaces increase the flexibility of the hardware since developers can more easily create programs using a common interface. For example, open hardware interfaces are often utilized for device controllers, which are used to access and control the various peripheral devices connected to a computer system. These controllers serve to coordinate and manage the data communication to and from the peripheral devices. Exemplary controllers include integrated drive electronics (IDE) controllers, small computer system interface (SCSI) controllers, and other similar chips that control peripheral devices.

Generally, controllers include a computer chip known as an application-specific integrated circuit (ASIC). ASICs are usually created for a specific purpose or application such as controlling SCSI devices, RAID arrays, or other similar devices. ASICs that manage SCSI devices are commonly known as SCSI chips. A SCSI controller generally includes a SCSI chip. By use of software device drivers, a host computer can instruct a SCSI chip to manage specific peripheral devices and control the data transfer between the peripheral device and the host computer.

FIG. 1 is a block diagram showing a motherboard having a built in SCSI controller for managing peripheral devices, and an input/output processor (IOP) for controller management. The motherboard includes a host central processing unit (CPU), and a SCSI controller 102 in communication with a SCSI peripheral device 108, which in this example is a redundant array of independent disks (RAID). In communication with the SCSI controller 102 is a RAID IOP 104, which provides I/O management for the SCSI controller 102. In addition, a memory device 106, such as an electronically erasable programmable read only memory (EEPROM) can be placed in communication with the SCSI controller 102.

In operation, the RAID IOP 104 manages the read and write operations to the RAID storage array 108 by directing the SCSI controller 102 to perform the read and write operations. In addition, the SCSI controller 102 can obtain configuration information from the memory device 106. As mentioned above, the SCSI controller 102 uses a standardized open hardware interface that allows developers to create programs using a common interface, thus increasing the ease with which software is developed for the SCSI controller 102. Furthermore, the open interface architecture allows controller software to execute on a plurality of different controllers, manufactured by a plurality of different manufactures.

Unfortunately, the open interface architecture of the SCSI controller 102 also facilitates software piracy for software created for use with the controller 102. Moreover, although a SCSI controller is illustrated in FIG. 1, it should be noted that the potential for software piracy exist for all controllers having an open interface architecture. For example, since controller software can execute on a plurality of different controllers using the standardized interface, a motherboard manufacturer can copy software developed for controllers on other motherboards, and use the software on their motherboards. Thus, the pirating motherboard manufacturer avoids the cost and labor of developing the controller software, while the actual controller software developer is uncompensated. Even when the EEPROM 106 is utilized to store particular configuration information, the pirating manufacturer can copy the contents of original EEPROM 106 onto their EEPROM, thus making their EEPROM function as though it was the original EEPROM 106.

In view of the foregoing, there is a need for systems and methods for authenticating embedded devices on motherboards to ensure software is being executed on an appropriate device. The methods should preserve the industry open interface architecture, and be capable of operating with controllers using input/output processors for I/O management.

SUMMARY OF THE INVENTION

Broadly speaking, embodiments of the present invention address the above-mentioned problems by utilizing unique authentication codes, each unique to a particular motherboard, to verify software is being executed on an approved motherboard. In this manner, software can be made to execute only on a particular motherboard, thus preventing unauthorized usage of the software on other motherboards. In one embodiment, a method for authenticating software associated an embedded device on a motherboard having an IOP is disclosed. The method includes generating a unique authentication code (UAC) based on a serial number for a motherboard. The UAC is provided to a computer system having the motherboard, and a determination is made as to whether the provided UAC is correct for the motherboard. When the provided UAC is correct for the motherboard, the IOP is allowed to execute program instructions for the embedded device. In one aspect, the serial number for the motherboard can be read from memory located on the motherboard, and a UAC can be calculated based on the read serial number. In this case, the calculated UAC can be compared to the provided UAC, and the provided UAC can be designated as a correct UAC for the motherboard if the calculated UAC matches the provided UAC.

A system for authenticating software associated with an embedded device on a motherboard having an IOP is disclosed in an additional embodiment of the present invention. The system includes a motherboard having a system BIOS capable of receiving a UAC and determining whether the received UAC is correct for the motherboard. Also, NVRAM is included that has a UAC approved bit that is set when the received UAC is correct for the motherboard. In addition, an IOP is included that is coupled to the embedded device. The IOP includes an IOP approved bit that is set when the UAC approved bit is set. The IOP further includes program instructions for the embedded device that are executed when the IOP approved bit is set. In operation, the system BIOS can read a serial number for the motherboard from memory located on the motherboard and calculate a UAC based on the read serial number. The system BIOS can then compare the calculated UAC to the received UAC. In one aspect, the IOP can include an option ROM BIOS that writes a UAC signature in memory, which is in communication with the IOP. The UAC signature is a particular bit pattern. In this aspect, the system can include a device driver for the embedded device that terminates execution when the UAC signature is not present in the memory.

A computer program embodied on a computer readable medium for authenticating software associated with an embedded device on a motherboard having an IOP is disclosed in a further embodiment of the present invention. The computer program includes program instructions that receive a UAC for a computer system having the motherboard. As above, the UAC is based on a serial number for a motherboard. Program instructions are also included that determine whether the received UAC is correct for the motherboard. Program instructions are further included that allow the IOP to execute program instructions for the embedded device when the received UAC is correct for the motherboard. Similar to above, program instructions can be included that read the serial number for the motherboard from memory located on the motherboard and calculate a UAC based on the read serial number. In this case, program instructions can also be included that compare the calculated UAC to the received UAC and designate the received UAC as a correct UAC for the motherboard when the calculated UAC matches the received UAC.

In this manner, embodiments of the present invention advantageously allow authentication of device software to protect against software piracy when using an open interface device. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for authentication of embedded RAID controllers on a motherboard having input/output processor. In general embodiments of the present invention utilize unique authentication codes, each unique to a particular motherboard, to verify software is being executed on an approved motherboard. In this manner, software can be made to execute only on a particular motherboard, thus preventing usage of the software on other motherboards. As a result, software copied from one motherboard to another motherboard will not execute, thus avoiding unauthorized software use. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
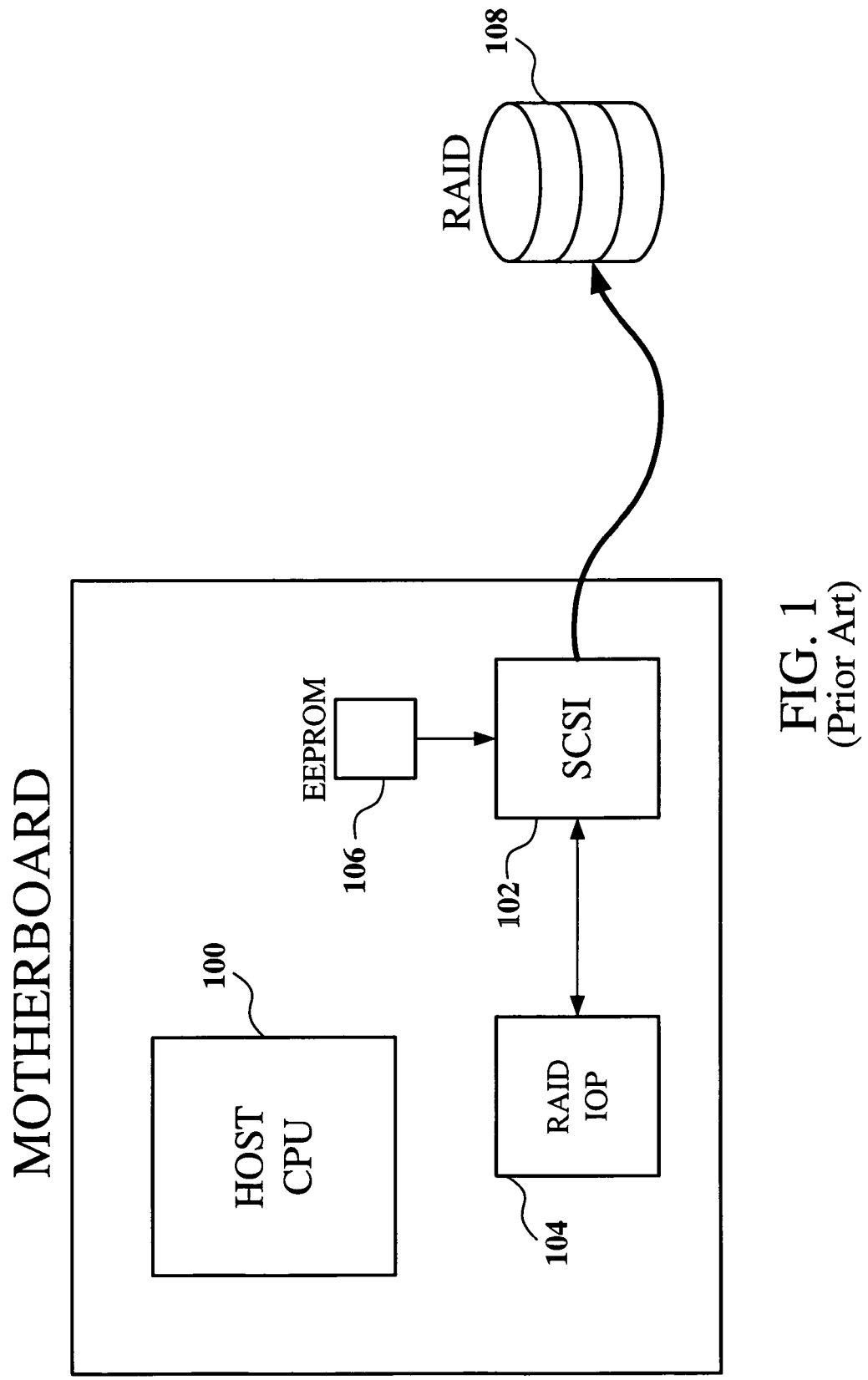
FIG. 1 is a block diagram showing a motherboard having a built in SCSI controller for managing peripheral devices and an input/output processor (IOP)
Figure 2:
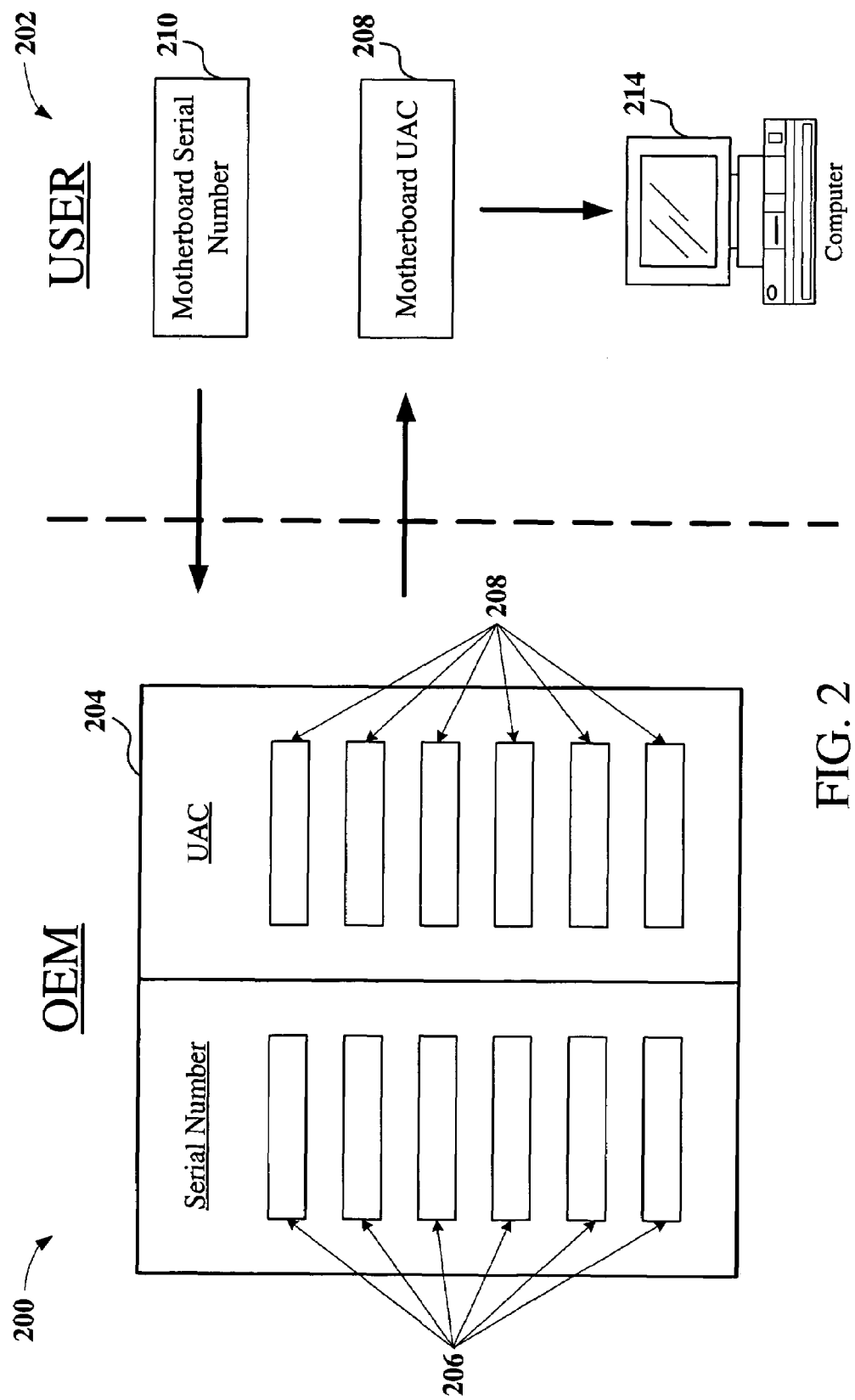
FIG. 2 is an illustration showing a method for authenticating embedded devices on a motherboard, in accordance with an embodiment of the present invention.

FIG. 1 was described in terms of the prior art. FIG. 2 is an illustration showing a method for authenticating embedded devices on a motherboard, in accordance with an embodiment of the present invention. As mentioned above, embodiments of the present invention assign a unique authentication code (UAC) to each motherboard based on the serial number of the motherboard. When controller software is executed, the system BIOS in conjunction with an IOP verify that the software is being executed on a particular motherboard based on the UAC. Thus, if the controller software is executed on another motherboard with a different serial number, the controller software will not execute.

For example, FIG. 2 is divided into two sections, an original equipment manufacturer (OEM) section 200 illustrating operations for the OEM, and a user section 202 illustrating operations for the user. In one embodiment of the present invention, each OEM maintains a UAC database 204 storing a plurality of motherboard serial numbers 206 and a corresponding UAC 208 for each motherboard serial number 206. As is well known to those skilled in the art, motherboard manufacturers routinely assign a serial number 206 to each motherboard the manufacturer generates. These serial numbers can then be utilized to identify and track the motherboards. However, embodiments of the present invention also generate a UAC 208 for each motherboard serial number.

In general, using the embodiments of the present invention, each OEM creates a UAC generation function that generates a UAC when provided with a unique serial number. In this manner, the OEM can utilize its UAC generation function to generate a UAC 208 for each motherboard serial number 206. In an additional embodiment, as will be described in greater detail below, the OEM can generate a UAC 208 for a particular serial number 206 only when requested by a user. Each UAC 208 is utilized to authenticate the motherboard being utilized to execute a particular software program. Thus, each UAC is preferably unique both to the particular serial number 206 and to the particular software developer. That is, generally two software developers will not share the same UAC corresponding to a particular serial number. However, it should be noted that this is not required for the embodiments of the present invention to be utilized. Optionally, additional security can be achieved by limiting the UAC to a particular software product of a developer.

In general, to execute protected software, the user provides their motherboard serial number 210 to the OEM. The OEM uses the UAC database 204 to perform a lookup operation to find the user's motherboard serial number 210. Once the OEM finds a serial number 206 in the UAC database 204 that matches the user's motherboard serial number 210, the OEM provides the corresponding UAC 208 to the user. The user then enters the obtained UAC 208 into the user's computer 214. Thereafter, the system basic input out system (BIOS) verifies the validity of the entered UAC 208 and, if the entered UAC 208 is authentic, allows the protected software to execute.

In one example, embodiments of the present invention can be utilized to enable embedded devices, such as a RAID device, via software authentication. In this example, a motherboard manufacturer can sell a motherboard having an embedded RAID device. At the time of sale, for example, the manufacturer can sell the motherboard as having a 'disabled' RAID device that can later be 'enabled' by the user when needed. In this case, the motherboard can be sold for a discount, with the user paying extra if and when the user wishes to enable the RAID device. To enable the RAID device, the user contacts the manufacturer and provides the serial number to the motherboard, as described above, along with, for example, a possible payment. The OEM then provides the user with a UAC corresponding to the motherboard serial number, as described above. Upon providing the received UAC to the system, the computer system verifies the UAC and allows the software for the RAID device to execute, as described in greater detail below.

Figure 3A:
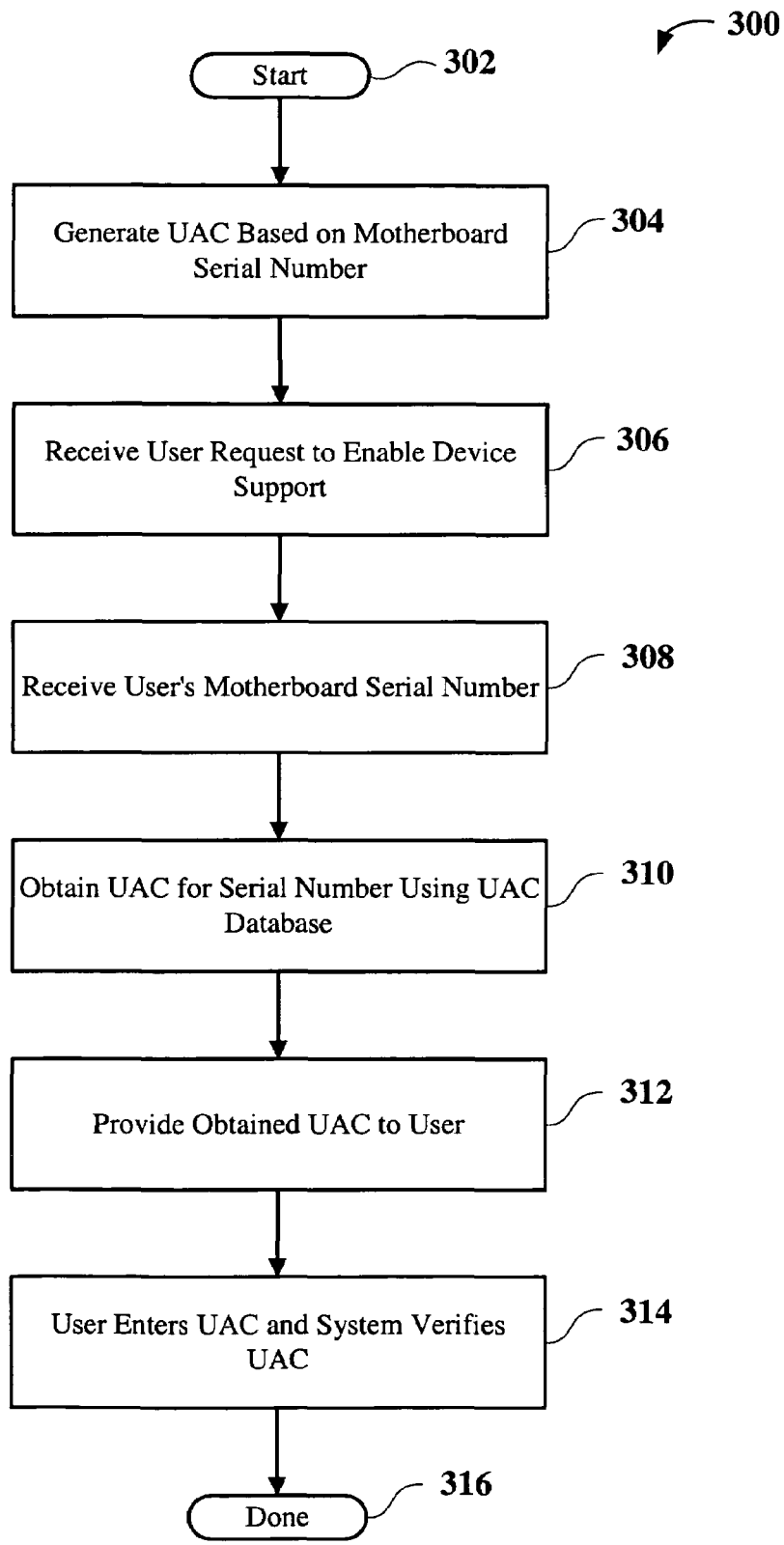
FIG. 3A is a flowchart showing a method for authenticating a motherboard for use with protected software using pre-generated UACs, in accordance with an embodiment of the present invention.

FIG. 3A is a flowchart showing a method 300 for authenticating a motherboard for use with protected software using pre-generated UACs, in accordance with an embodiment of the present invention. In an initial operation 302, preprocess operations are performed. Preprocess operations can include, for example, creating a UAC database, generating a motherboard serial number for each motherboard manufactured, and other preprocess operations that will be apparent to those skilled in the art after a careful reading of the present disclosure.

In operation 304, a UAC is generated for each motherboard serial number for motherboards created by the particular OEM. In the embodiment of FIG. 3A, each OEM maintains a UAC database that stores a plurality of motherboard serial numbers and a corresponding UAC for each motherboard serial number. As is well known to those skilled in the art, motherboard manufacturers routinely assign a serial number to each motherboard the manufacturer generates. These serial numbers can then be utilized to identify and track the motherboards.

As mentioned previously, the OEM creates a UAC generation function that generates a UAC when provided with a unique serial number. In this manner, the OEM can utilize its UAC generation function to generate a UAC for each motherboard serial number. Each UAC is utilized to authenticate the motherboard being utilized to execute a particular software program. Thus, each UAC is preferably unique both to the particular serial number and to the particular software developer. That is, generally two software developers will not share the same UAC corresponding to a particular serial number. However, it should be noted that this is not required for the embodiments of the present invention to be utilized. Optionally, as mentioned above, additional security can be achieved by limiting the UAC to a particular software product of a developer.

A request is received from a user to enable device support, in operation 306. As mentioned above, embodiments of the present invention can be utilized to ensure device firmware and software is being executed on an approved motherboard. In this manner, use of a particular developer's software and firmware for a particular device will only execute on an approved motherboard. This protection is afforded using a UAC for the particular motherboard. Thus, in operation 306, the OEM receives a request to enable a device from the user. In response, the OEM can approve the user in some manner, for example, after receiving payment for the software usage.

In operation 308, the serial number of the user's motherboard is received. As described above, motherboard manufacturers routinely assign a serial number to each motherboard the manufacturer generates, which can be utilized to identify and track the motherboards. Generally, the user provides the serial number for the user's motherboard to the OEM when requesting the device support described in operation 306. In this manner, the OEM can verify that the serial number is a valid serial number for a motherboard the OEM manufactured. In addition, the serial number can be used to obtain the corresponding UAC, as described next.

The UAC corresponding to the received motherboard serial number is obtained in operation 310. As described above, the OEM maintains a UAC database that stores a plurality of motherboard serial numbers and a corresponding UAC for each motherboard serial number. In operation 310, a lookup operation, for example, can be performed on the database using the received motherboard serial number as input to obtain the UAC corresponding to the received motherboard serial number.

Upon obtaining the UAC corresponding to the received motherboard serial number, the obtained UAC is provided to the user, in operation 312. In one embodiment, the UAC can be downloaded and/or mailed on a CD-ROM, along with the protected software, to the user. The UAC can be either exposed, wherein the user can read the UAC, or unexposed, wherein the UAC is hidden from the user. In addition, the UAC can be provided to the user alone. For example, the UAC can be read to the user over a telephone, downloaded from a website, mailed on a CD, or provided to the user using any other mechanism that will be apparent to those skilled in the art after a careful reading of the present disclosure.

In operation 314, the user computer system receives the obtained UAC and uses the UAC to verify the software is being executed on the appropriate motherboard. As mentioned above, the UAC can be provided to the user either exposed or unexposed. When the UAC is exposed, the user is able to read the UAC and manually enter the UAC into the computer system. When the UAC is unexposed, the actual UAC is hidden from the user in some manner. In this aspect, a computer program is utilized that will read UAC from the CD and provide the UAC to the system for verification automatically. Once the system receives the UAC, the system verifies the UAC, and if approved, allows the protected software and/or firmware to execute.

Post process operations are performed in operation 316. Post process operations can include, for example, installing the software for the device, executing the device software and firmware, and other post process operations that will be apparent to those skilled in the art after a careful reading of the present disclosure. In this manner, embodiments of the present invention advantageously allow authentication of device software to protect against software piracy when using an open interface device. In addition, to using a pre-generated UAC device as described above, embodiments of the present invention can generate UACs upon request, as described in greater detail below with respect to FIG. 3B.

Figure 3B:
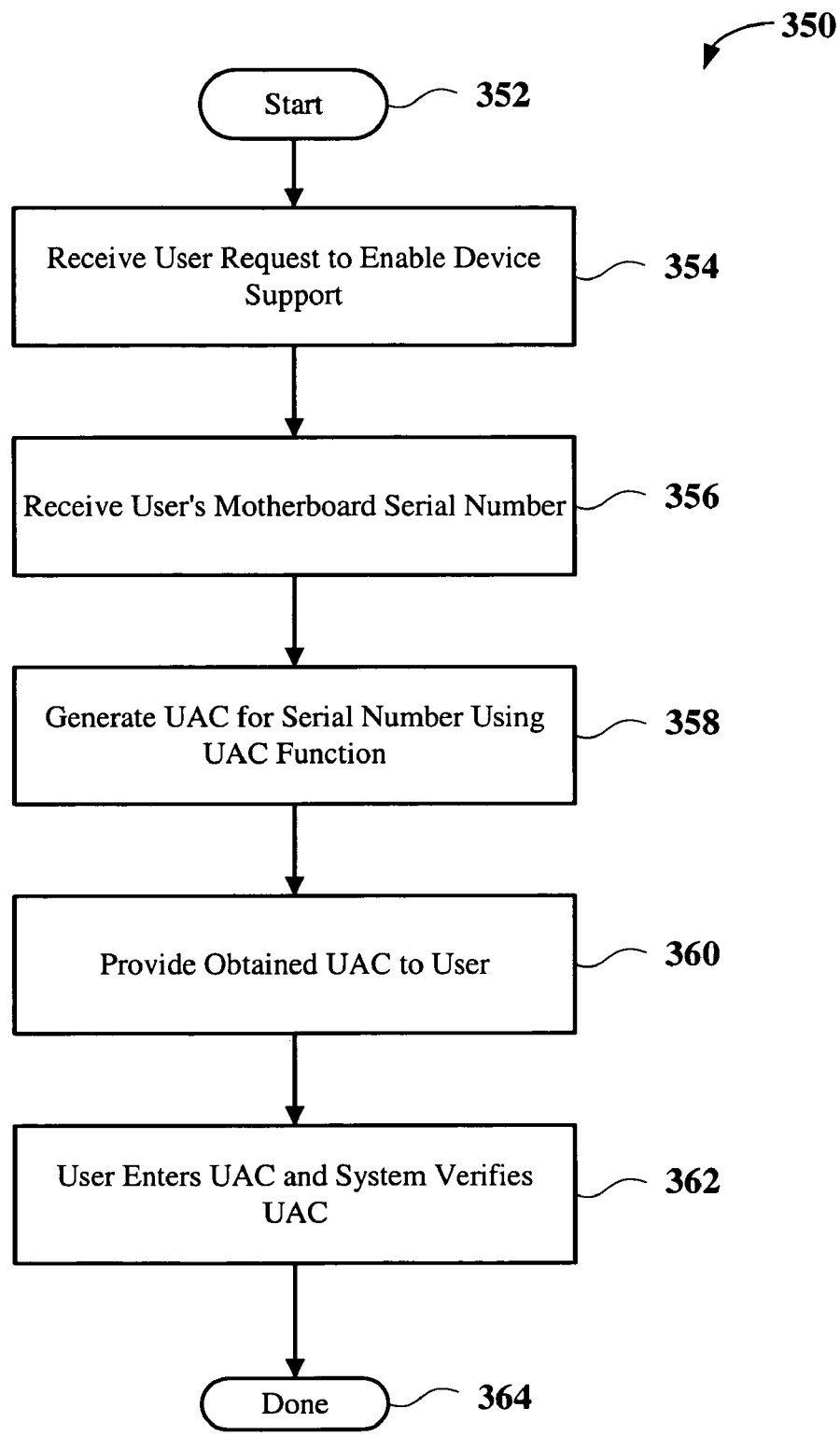
FIG. 3B is a flowchart showing a method for authenticating a motherboard for use with protected software by generating UACs upon request, in accordance with an embodiment of the present invention.

FIG. 3B is a flowchart showing a method 350 for authenticating a motherboard for use with protected software by generating UACs upon request, in accordance with an embodiment of the present invention. In an initial operation 352, preprocess operations are performed. Preprocess operations can include, for example, generating a motherboard serial number for each motherboard manufactured, creating a UAC generation function, and other preprocess operations that will be apparent to those skilled in the art after a careful reading of the present disclosure.

In operation 354, a request is received from a user to enable device support. As mentioned above, embodiments of the present invention can be utilized to ensure device firmware and software is being executed on an approved motherboard. This protection is afforded using a UAC for the particular motherboard. Thus, in operation 354, the OEM receives a request to enable a device from the user. In response, the OEM can approve the user in some manner, for example, after receiving payment for the software usage.

In operation 356, the serial number of the user's motherboard is received. Generally, the user provides the serial number for the user's motherboard to the OEM when requesting the device support described in operation 354. In this manner, the OEM can verify that the serial number is a valid serial number for a motherboard the OEM manufactured. In addition, the serial number can be used to obtain the corresponding UAC, as described next.

In operation 358, a UAC is generated for the received motherboard serial number. In the embodiment of FIG. 3B, the OEM generates UACs when requested by a user, rather than creating a pre-generated UAC database as described with respect to FIG. 3A. As mentioned previously, the OEM creates a UAC generation function that generates a UAC when provided with a unique serial number. In this manner, the OEM can utilize its UAC generation function to generate a UAC for the user's motherboard based on the received motherboard serial number.

Upon generating the UAC corresponding to the received motherboard serial number, the generated UAC is provided to the user, in operation 360. As described previously, the UAC can be downloaded and/or mailed on a CD-ROM, along with the protected software, to the user. The UAC can be either exposed, wherein the user can read the UAC, or unexposed, wherein the UAC is hidden from the user. In addition, the UAC can be provided to the user alone. For example, the UAC can be read to the user over a telephone, downloaded from a website, mailed on a CD, or provided to the user using any other mechanism that will be apparent to those skilled in the art after a careful reading of the present disclosure.

In operation 362, the user computer system receives the obtained UAC and uses the UAC to verify the software is being executed on the appropriate motherboard. As mentioned above, the UAC can be provided to the user either exposed or unexposed. When the UAC is exposed, the user is able to read the UAC and manually enter the UAC into the computer system. When the UAC is unexposed, the actual UAC is hidden from the user in some manner. In this aspect, a computer program is utilized that will read the UAC from the CD and provide the UAC to the system for verification automatically. Once the system receives the UAC, the system verifies the UAC, and if approved, allows the protected software and/or firmware to execute. Post process operations are performed in operation 364. Post process operations can include, for example, installing the software for the device, executing the device software and firmware, and other post process operations that will be apparent to those skilled in the art after a careful reading of the present disclosure.

Figure 4:
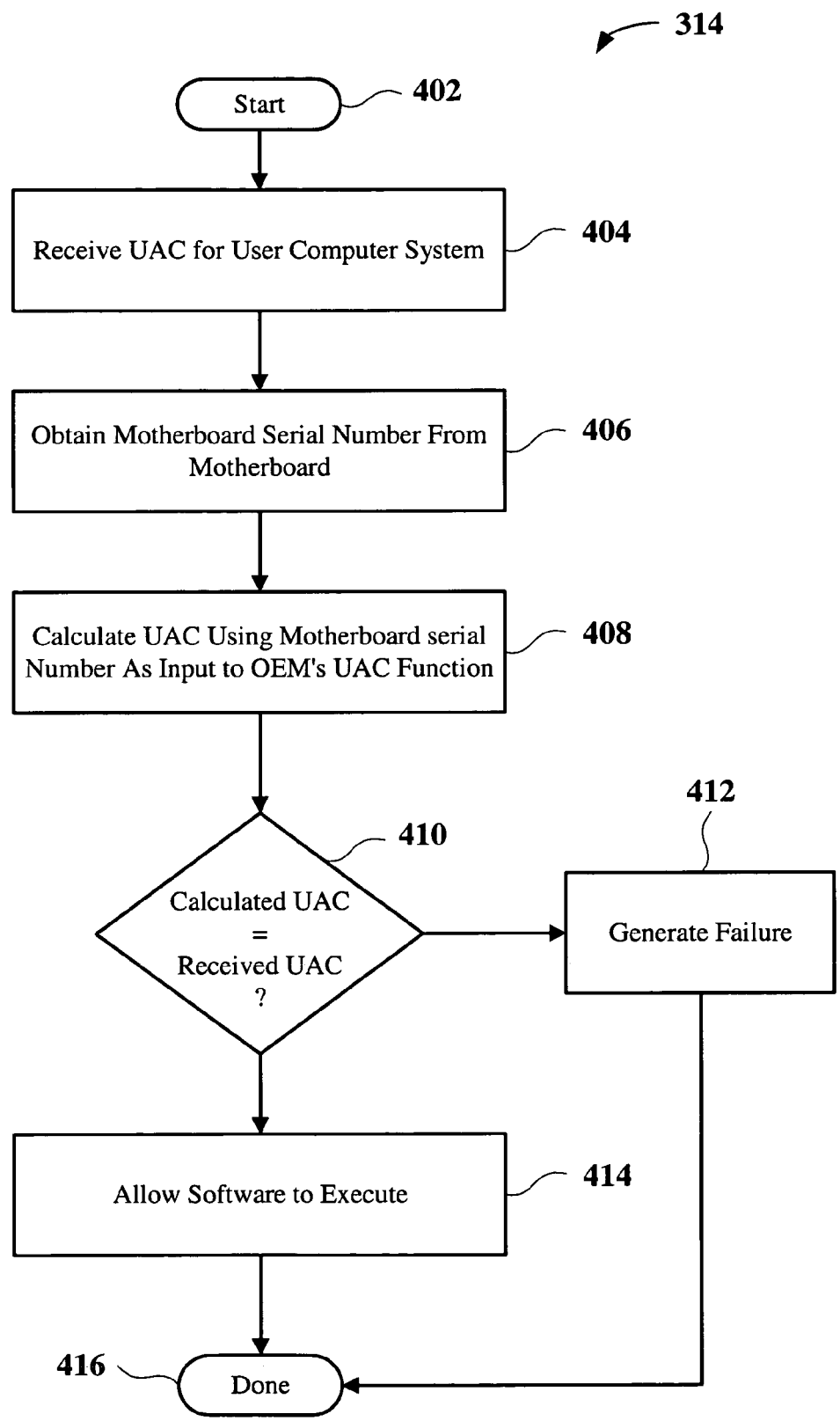
FIG. 4 is a flowchart showing a method for verifying the device software is being executed on the appropriate motherboard, in accordance with an embodiment of the present invention.

FIG. 4 is a flowchart showing a method 314 for verifying the device software is being executed on the appropriate motherboard, in accordance with an embodiment of the present invention. In an initial operation 402, preprocess operations are performed. Preprocess operations can include, for example, generating a UAC based on a motherboard serial number, providing the UAC to a user, and other preprocess operations that will be apparent to those skilled in the art after a careful reading of the present disclosure.

In operation 404, a UAC for the user's motherboard is received. As mentioned previously, the UAC can be provided to the user either exposed or unexposed. When the UAC is exposed user enters the UAC into the system manually. For example, the user can enter the system setup by pressing a specific hot key designated by the system BIOS during power on self test (POST) time. The user then, for example, browses the setup options to find an enable device option. Once the user selects this option, the user enters the obtained UAC into the computer system. When the UAC is unexposed, a computer program is utilized that reads the UAC from a CD or other computer storage and provides the UAC to the computer system for verification automatically. For example, the CD image can have a unique autorun or similar program to provide the UAC hidden on the CD to the system BIOS for verification.

The motherboard serial number is obtained from a device on motherboard, in operation 406. As mentioned above, motherboard manufacturers routinely assign a serial number to each motherboard the manufacturer generates, which can then be utilized to identify and track the motherboards. In general, the system BIOS is aware of the motherboard serial number, typically, by reading the serial number from a pre-designated memory location during system startup.

A UAC is then calculated using the serial number obtained from the motherboard, in operation 408. As mentioned above, the OEM creates a UAC generation function, which the OEM uses to generate a UAC when provided with a unique serial number. This UAC generation function is also available to the system BIOS. Hence, the system BIOS utilizes the UAC generation function to calculate a UAC using the serial number obtained from the motherboard as an input to the UAC generation function.

A decision is then made, in operation 410, as to whether the calculated UAC matches the received UAC, in operation 404. If the calculated UAC matches the received UAC, the method 400 continues to operation 414. However, if the calculated UAC does not match the received UAC, the method 400 branches to operation 412.

When the calculated UAC does not match the received UAC a failure is generated, in operation 412. Since the calculated UAC does not match the received UAC, the system has received an invalid UAC and will not allow the protected firmware and software to execute. As can be appreciated, when a user attempts to enter a UAC for another motherboard into the computer system, the UAC will not match because the motherboard serial number will generate a different UAC. As a result, the user will not be allowed to execute the protected firmware and software on another motherboard.

When the calculated UAC does matches the received UAC, the software is allowed to execute in operation 414. Since the calculated UAC matches the received UAC, the user has provided a valid UAC to the computer system and thus will be allowed to execute the protected software and firmware for the embedded device. Post process operations are performed in operation 416. Post process operations can include, for example, installing the software for the device, executing the device software and firmware, and other post process operations that will be apparent to those skilled in the art after a careful reading of the present disclosure.

Figure 5A:
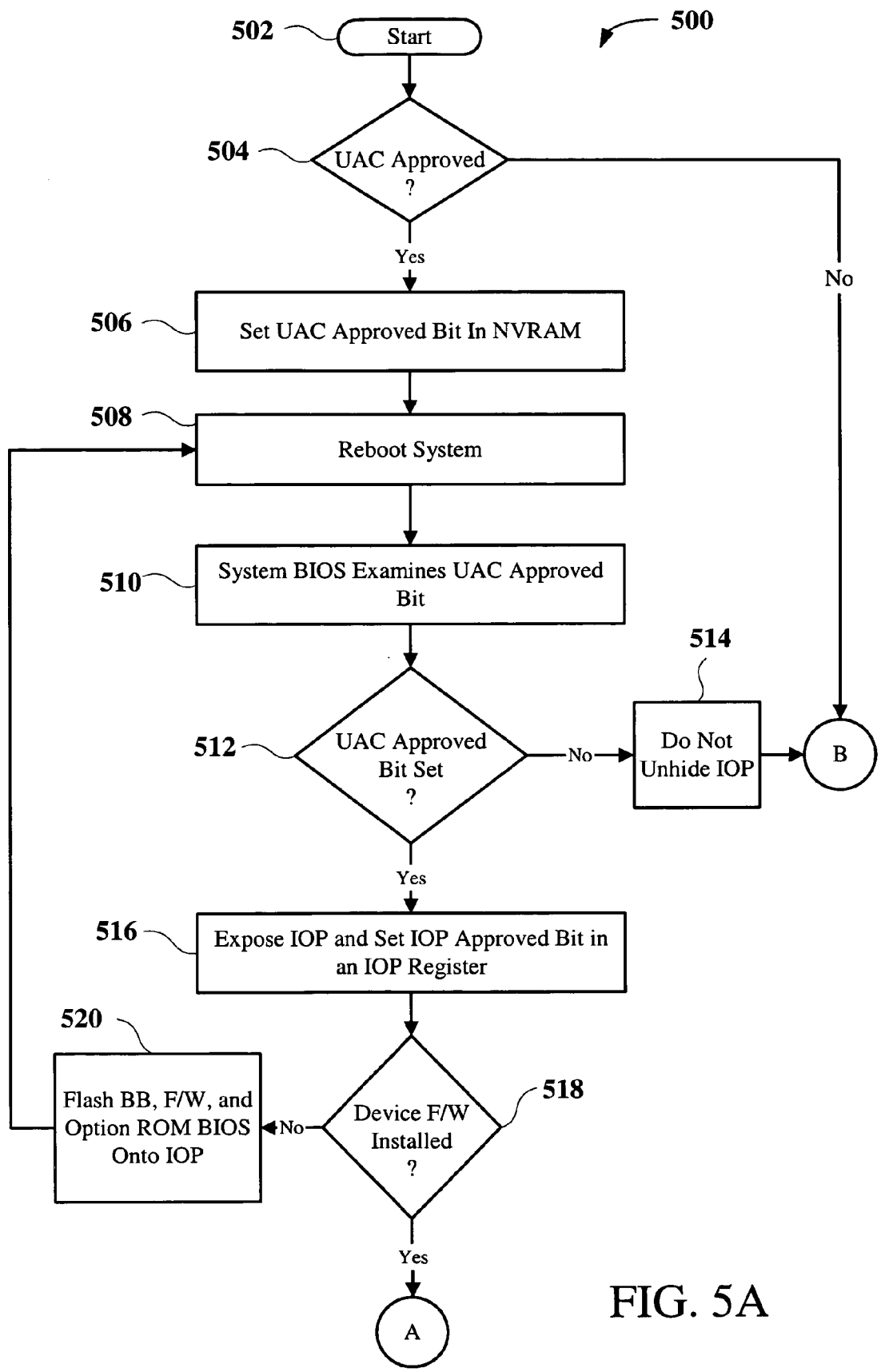
FIGS. 5A and 5B form a flowchart for a method for providing authentication of an embedded device on a motherboard having an IOP, in accordance with an embodiment of the present invention.
Figure 5B:
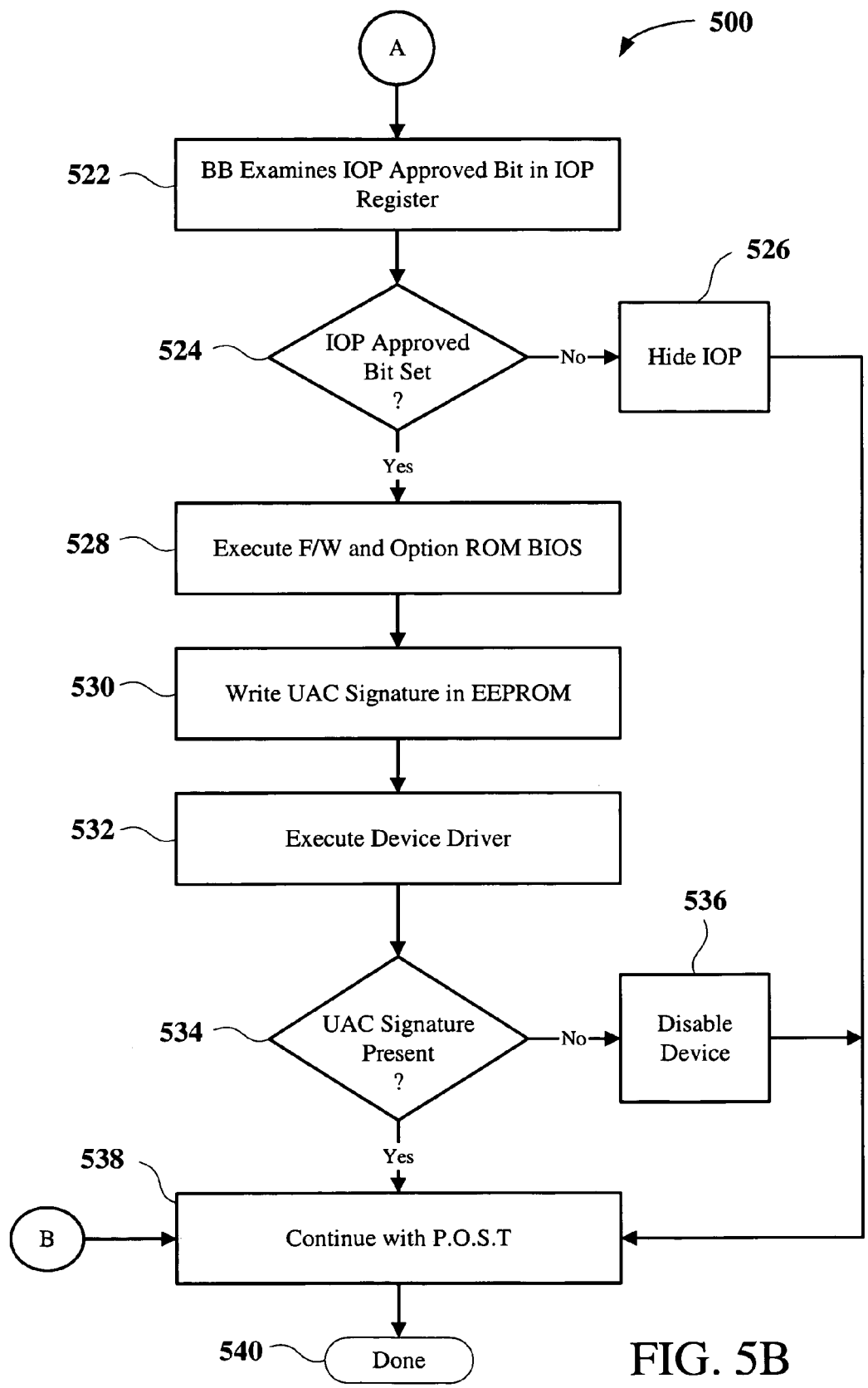

FIGS. 5A and 5B form a flowchart for a method 500 for providing authentication of an embedded device on a motherboard having an IOP, in accordance with an embodiment of the present invention. In an initial operation 502, preprocess operations are performed. Preprocess operations can include for example, obtaining a UAC for the current motherboard, providing the obtained UAC to the computer system, authenticating the UAC, and other preprocess operations that will be apparent to those skilled in the art after a careful reading of the present disclosure.

A decision is made, in operation 504, as to whether a UAC received by the system is approved. As described with reference to FIG. 4, once the computer receives a UAC from a user, the system checks the UAC to determine whether the correct UAC has been entered into the system. If UAC received by the system is approved, the method 500 continues to operation 506. Otherwise, the method 500 continues to pointer B.

Figure 6:
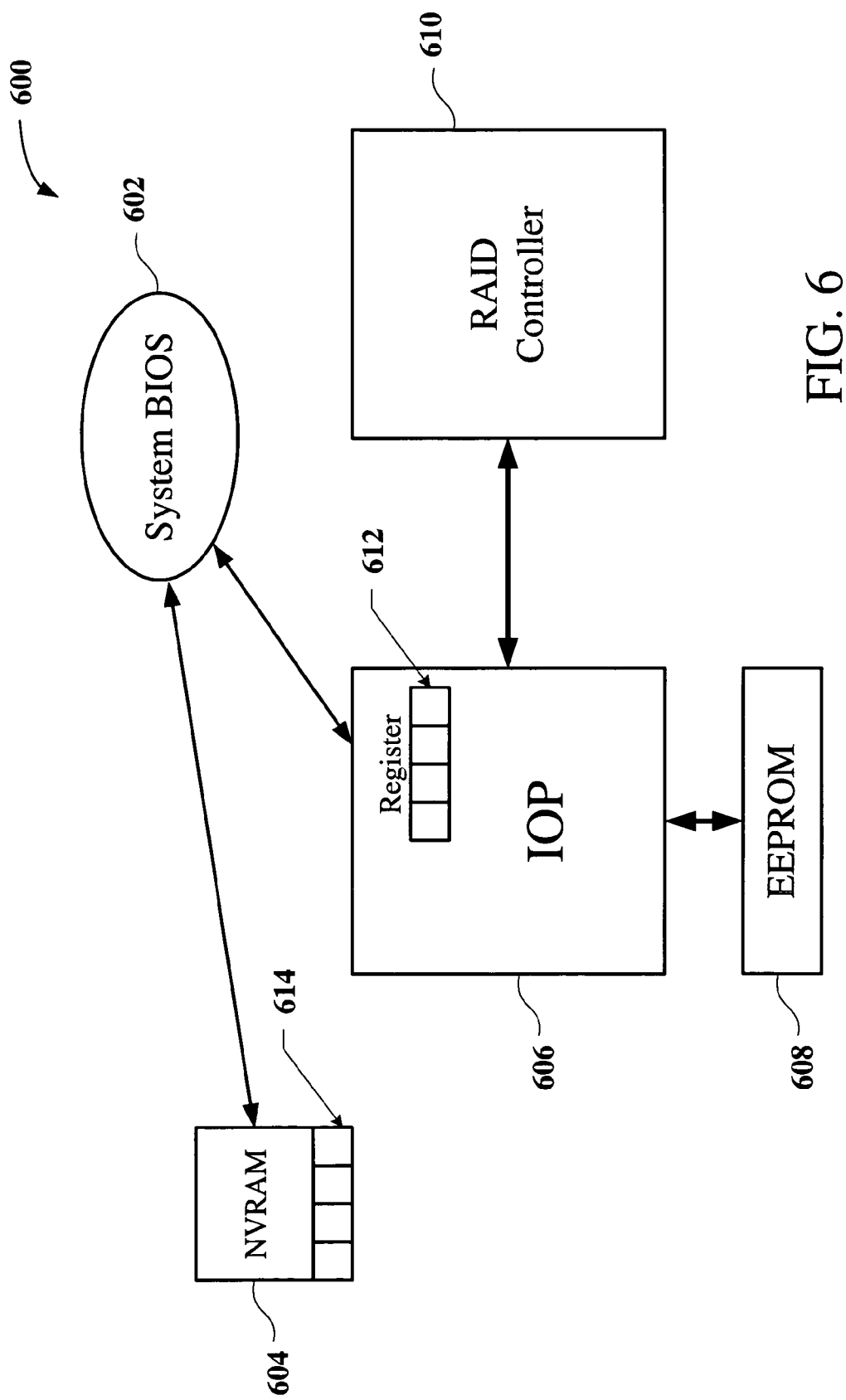
FIG. 6 is a block diagram showing a system for authentication of an embedded RAID on a motherboard having input/output processor, in accordance with an embodiment of the present invention.

In operation 506, a UAC approval bit is set in the system non-volatile random access memory (NVRAM). FIG. 6 is a block diagram showing a system 600 for authentication of an embedded raid on a motherboard having input/output processor, in accordance with an embodiment of the present invention. Although FIG. 6 will be described in terms of an embedded RAID, it should be noted that embodiments of the present invention can be utilized for authentication of any embedded device on a motherboard having an IOP, such as a SCSI drive or IDE drive.

Once the UAC has been approved, the system BIOS 602 sets a UAC approved bit 614 in the system NVRAM 604 indicating that a verified UAC has been entered into the system 600. In general, the system NVRAM 604 stores the CMOS settings for the system 600. Embodiments of the present invention designate a bit in the NVRAM as a UAC approved bit 614, which is set to indicate that the protected device, for example the RAID controller 610, is now enabled for usage. It should be noted that additional approved bits can be designated in the NVRAM 604 to indicate that different embedded devices are enabled, and/or different software for the embedded devices are enabled for use on the system 600. For example, two different UAC enable bits can be designated in the NVRAM to indicate enabling of RAID software from two different developers. In this case, each developer has a unique UAC for the particular motherboard and, once entered into the system, each developer's UAC allows setting of that developer's particular UAC approved bit 614. In this manner, different device software can be approved for the same motherboard separately.

Referring back to FIG. 5A, the system is rebooted in operation 506. When the system BIOS initially sets the UAC approved bit 614 in the NVRAM 604, the system BIOS reboots the computer system. In addition, whenever the computer system is restarted, the method 500 continues from operation 508. That is, whenever the computer is restarted, the UAC approved bit will be examined as described next.

In operation 510, the system BIOS examines the UAC approved bit. Referring to FIG. 6, upon booting the computer system 600, the system BIOS 602 examines the UAC approved bit 614 in the NVRAM 604 to determine whether the system is approved to utilize the embedded device, as shown in the example of FIG. 6 with the embedded RAID controller 610. As can be appreciated, setting the UAC approved bit 614 in the NVRAM allows the system to remember that an approved UAC has been previously entered into the system 600, thus allowing the embedded device to be utilized without requiring reentering of the UAC each time the system is booted.

A decision is then made as to whether the UAC approved bit is set, in operation 512. If the UAC approved bit is set, the method 500 continues with operation 516. Otherwise, the method branches to operation 514, wherein the IOP for the device is not exposed and the method 500 continues to pointer B.

In operation 516, the IOP is exposed and an IOP approved bit, or bits, is set in an IOP register. Referring to FIG. 6, once the system BIOS 602 determines that the UAC approved bit 614 is set in the NVRAM 604, the system BIOS 602 exposes the IOP 606 for the RAID controller 610 and sets an IOP approved bit in an IOP register 612. The actual number of bits set can vary depending on the implementation utilized. As will be described in greater detail subsequently, the location of the IOP approved bit or bits generally is not known to software or firmware other than the system BIOS and the particular firmware being protected by the embodiments of the present invention. In this manner, the IOP approved bit forms additional protection from unauthorized use.

Referring back to FIG. 5A, a decision is made as to whether the firmware for the device is currently installed on the IOP core, in operation 518. Embodiments of the present invention allow motherboards to be provided to users with the firmware previously installed on the system, or without previous installation of the firmware. As can be appreciated, pre-installed firmware is still protected from unauthorized use, since both the UAC approved bit in the NVRAM and the IOP approved bit in the IOP must be set in order for the firmware to execute. However, in specific implantations it may be advantageous to ship the motherboard without pre-installed firmware. If the firmware for the device is currently installed on the IOP core, the method 500 continues to pointer A of FIG. 5B. Otherwise, the method 500 branches to operation 520, wherein the boot block (BB), firmware, and option ROM BIOS are flashed into the IOP core. Typically, the BB, firmware, and option ROM BIOS are flashed into the IOP core using utility software for this purpose.

From pointer A, the method 500 continues to operation 522 on FIG. 5B, wherein the BB examines the IOP approved bit in the IOP register. Turning to FIG. 6, once the IOP is exposed, the BB for the device firmware begins executing and examines the IOP approved bit, or bits, in the particular IOP register 612 to determine whether the IOP approved bit is set. As discussed above, the IOP approved bit forms additional protection from unauthorized use so that the firmware cannot be used in an unauthorized manner once the IOP is exposed.

A decision is then made as to whether the IOP approved bit is set, in operation 524. As discussed above, the IOP approved bit is set if the system BIOS determines that the UAC approved bit is set in the NVRAM, thus indicating a valid UAC has been entered into the system. If the IOP approved bit is set, the method 500 continues with operation 528. Otherwise, the method 500 branches to operation 526, where the IOP is hidden and the method 500 continues to operation 538.

In operation 528, the firmware and option ROM BIOS for the device are executed. Referring to FIG. 6, once the BB determines the IOP approved bit is set in the IOP register 612, the firmware residing on the IOP core is executed. In addition, the option ROM BIOS for the device is executed. To provide addition software protection, the option ROM BIOS writes to an EEPROM for later verification.

Referring back to FIG. 5B, a UAC approval signature is written to an EEPROM in communication with the IOP, in operation 530. Turning to FIG. 6, the option ROM BIOS executing on the IOP writes a UAC approval signature to the EEPROM 608. The UAC approval signature will later be utilized as further verification by the device driver software, as described in greater detail subsequently.

Referring to FIG. 5B, the device driver is executed in operation 532. As will be apparent to those skilled in the art, the device driver provides an interface between the system operating system and the end device, in the example of FIG. 6, the RAID drive. In addition, when the device driver is updated without restarting the computer system, the method 500 begins at operation 532. That is, embodiments of the present invention allow the device driver to be updated without restarting the system, yet still provide protection from unauthorized use.

A decision is then made as to whether the UAC signature is present in the EEPROM, in operation 534. Referring to FIG. 6, when the device driver is executed, including when the device driver is updated, the device driver examines the EEPROM 608 to determine if the UAC approval signature is present in the EEPROM 608. As described above, the option ROM BIOS writes the UAC approval signature to the EEPROM 608 to indicate the system has been approved to use the RAID device. In this manner, the EEPROM 608 signature can be checked to verify authentication whenever the driver is updated without requiring a system reboot. Referring back to FIG. 5B, if the UAC signature is present in the EEPROM the method 500 continues with operation 538. Otherwise, the method 500 branches to operation 536, wherein the device is disabled. That is, if the UAC signature is not found, the device driver will not enable the RAID device for use.

In operation 538, the system BIOS continues with the usual P.O.S.T. startup operations. Post process operations are then performed in operation 540. Post process operations can include for example, further UAC embedded device checks, device operations, and other post process operations that will be apparent to those skilled in the art. In this manner, embodiments of the present invention advantageously allow authentication of device software to protect against software piracy when using an open interface device.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for authenticating software associated with a motherboard of a computer, the motherboard having at least one protected firmware including an embedded Redundant Array of Independent Disks (RAID) controller, and an input/output processor (IOP) for managing read and write operations to a RAID storage array, the method comprising:

maintaining a binary word including a plurality of bits, the binary word is maintained at a location known to a BIOS of the computer and the at least one protected firmware is represented by at least one bit in the plurality of bits;

generating a unique authentication code (UAC) based on a serial number for the motherboard;

providing the UAC to the computer;

determining whether the UAC is valid for the motherboard, wherein once a determination is made that the UAC is valid, one of the plurality of bits corresponding to the embedded RAID controller in the binary word is set to indicate that the RAID controller has been authenticated and the UAC need not be provided to the computer each time the computer boots; and allowing the IOP to execute program instructions for the embedded RAID controller when the UAC is valid for the motherboard, and preventing the IOP from executing the program instructions for the embedded RAID controller, thereby disabling the embedded RAID controller, when the UAC is invalid.

2. The method as recited in claim 1, further comprising:
reading the serial number for the motherboard from memory located on the motherboard; and
calculating a UAC based on the read serial number.

3. The method as recited in claim 2, further comprising comparing the calculated UAC to the UAC that was provided to the computer.

4. The method as recited in claim 3, further comprising the operation of designating the UAC as a valid UAC for the motherboard when the calculated UAC matches the UAC that was provided to the computer.

5. The method as recited in claim 1, further comprising the operation of setting a UAC approved bit in non-volatile random access memory when the UAC is valid for the motherboard.

6. The method as recited in claim 5, further comprising the operation of setting an IOP approved bit in the IOP when the UAC approved bit is set.

7. The method as recited in claim 6, further comprising the operation of executing program instructions managing the read and write operations to the RAID storage array when the IOP approved bit is set.

8. The method as recited in claim 7, further comprising the operation of writing a UAC signature in memory in communication with the IOP, the UAC signature being a particular bit pattern.

9. The method as recited in claim 8, further comprising the operation of allowing a device driver for the embedded RAID controller to fully execute when the UAC signature is present in the memory.

10. A motherboard of a computer system, the motherboard comprising:
   at least one protected firmware including an embedded Redundant Array of Independent Disks (RAID) controller;
   an input/output processor (IOP) for managing read and write operations to a RAID storage array;
   a basic input output system (BIOS) capable of receiving a unique authentication code (UAC) and determining whether the received UAC is valid for the motherboard; and
   a non-volatile random access memory (NVRAM) having a UAC approved bit associated with the RAID controller, wherein the UAC approved bit is set when the received UAC is valid for the motherboard, the BIOS being configured to expose the IOP and set an IOP approved bit when the UAC approved bit is set, wherein the NVRAM maintains a binary word including a plurality of bits, the binary word is maintained at a location in the NVRAM that is known to the BIOS and the at least one firmware is represented by at least one bit in the plurality of bits;
   program instructions defined to determine if the UAC approved bit is set and to enable the RAID controller to work without a need for providing the UAC to the computer system each time the computer boots; and
   IOP program instructions that are executed on the IOP, the IOP program instructions being configured to examine the IOP bit and execute RAID management instructions for the embedded RAID controller only when the IOP approved bit is set.

11. The system as recited in claim 10, wherein the BIOS reads a serial number for the motherboard from memory located on the motherboard and calculates a UAC based on the read serial number, and wherein the BIOS compares the calculated UAC to the received UAC.

12. The system as recited in claim 11, wherein the received UAC is designated as a valid UAC for the motherboard when the calculated UAC matches the received UAC.

13. The system as recited in claim 12, wherein the IOP includes an option ROM BIOS that writes a UAC signature in memory in communication with the IOP, the UAC signature being a particular bit pattern.

14. The system as recited in claim 13, further comprising a device driver for the embedded RAID controller, the device driver being terminated when the UAC signature is not present in the memory.

15. A computer readable physical storage medium embodying a computer program for authenticating software associated with a motherboard of a computer, the motherboard having at least one protected firmware including an embedded Redundant Array of Independent Disks (RAID) controller, the authenticating software configured for execution on an input/output processor (IOP) of a RAID controller embedded on a motherboard, the physical storage medium storing program instructions, the program instructions comprising:
   program instructions for maintaining a binary word including a plurality of bits, the binary word is maintained at a location known to a BIOS of the computer only and the at least one protected firmware is represented by at least one bit in the plurality of bits;
   program instructions that receive a unique authentication code (UAC) for a computer system having the motherboard, the received UAC being based on a serial number for a motherboard;
   program instructions that determine whether the received UAC is valid for the motherboard, wherein once a determination is made that the UAC is valid, one of the plurality of bits corresponding to the embedded RAID controller in the binary word is set to indicate that the RAID controller has been authenticated and the UAC need not be provided to the computer each time the computer boots;
   program instructions that allow the IOP to execute the software configured for execution on the IOP when the received UAC is valid for the motherboard, the software configured for execution on the IOP including instructions for managing read and write operations to a RAID storage array; and
   program instructions that prevent the IOP from executing the software configured for execution on the IOP when the received UAC is invalid for the motherboard.

16. The computer readable physical storage medium of claim 15, wherein the program instructions further comprise program instructions that read the serial number for the motherboard from memory located on the motherboard and calculate a UAC based on the read serial number.

17. The computer readable physical storage medium of claim 16, wherein the program instructions further comprise program instructions that compare the calculated UAC to the received UAC and designate the received UAC as a valid UAC for the motherboard when the calculated UAC matches the received UAC.

18. The computer readable physical storage medium of claim 15, wherein the program instructions further comprise program instructions that set a UAC approved bit in non-volatile random access memory when the UAC is valid for the motherboard.

19. The computer readable physical storage medium of claim 18, wherein the program instructions further comprise program instructions that set an IOP approved bit in the IOP when the UAC approved bit is set, wherein embedded program instructions for the RAID controller are executed when the IOP approved bit is set.

20. The computer readable physical storage medium of claim 19, wherein the embedded program instructions for the RAID controller write a UAC signature in memory in communication with the IOP, the UAC signature being a particular bit pattern, and wherein a device driver for the RAID controller is allowed to fully execute when the UAC signature is present in the memory.

* * * * *